United States Patent Office 3,061,523
Patented Oct. 30, 1962

3,061,523
METHOD FOR DETERMINING GLUCOSE IN BLOOD
Alfred H. Free, Elkhart, Ind., assignor to Miles Laboratories, Inc., Elkhart, Ind., a corporation of Indiana
No Drawing. Filed Nov. 7, 1956, Ser. No. 620,807
1 Claim. (Cl. 195—103.5)

This invention relates to a novel method and means for the detection and estimation of glucose in body fluids, particularly in blood.

The invention has for one of its primary objects the provision of a simple, rapid and convenient means for performing such test with a high degree of simplicity and without the need for extensive equipment, trained personnel and the like.

While the present invention is applicable to the determination of the glucose content of a wide variety of materials, one of its most important applications is in the detection of glucose in body fluids such as blood. The determination of glucose in blood is, of course, of signal importance not only to diabetic patients who must control their sugar input, but is essentially involved in those situations where large numbers of people are screened to determine the incidence of diabetes among them. A simple, rapid, convenient, and reliable test for detecting glucose in blood particularly in situations such as the foregoing would be of tremendous importance as an aid in the detection of this disease.

There are a number of methods, of course, which can be used to measure or estimate the amount of glucose in blood. The more widely used of the conventional are based on the use of alkaline copper solutions which are heated with the materials being tested to precipitate cuprous oxide.

The old methods have had the disadvantage that their use has required a certain amount of skill and familiarity with the use of measuring equipment such as pipettes and the like, the use of liquid reagents some of which, especially the alkaline ones, were dangerous to handle and inconvenient to transport easily.

However, all of these tests, techniques, and procedures have as characteristics in common the need for heat generally supplied by some extraneous source like a Bunsen burner to carry out the tests, and also require a test tube or like container within which the testing is to take place. Some of these tests additionally are impractically time-consuming.

I have now found a novel and highly effective means for detecting glucose in various materials including body fluids, particularly blood, which is simple, economical, rapid, convenient, reliable, which does not require the use of external or in fact any heat source, lends itself particularly well to use when "mass screening" of people for diabetes detection is employed, and which is free of many of the disadvantages which characterize prior compositions, testing means and procedures.

In practicing my invention, I prepare a composition of glucose-oxidase, peroxidase, an indicator whose color is affected by hydrogen peroxide in the presence of peroxidase, and in addition to the foregoing and desirably, a buffer to keep the pH of the reactants at the site of reaction within a predetermined range, a stabilizer such as gelatin or similar material, and in certain situations a dye to make color reading easier.

Such a composition may be made into a suspension or solution and used to impregnate a bibulous material such as paper, wood, fiber or the like, having any desired size or shape; such a product after drying (though drying is not essential) will undergo a distinct color change when contacted with glucose-containing material, e.g. blood.

Alternatively my composition may be by suitable, hereinafter described means, applied to splinters, sticks or strips made of e.g. wood, fiber, paper, glass, metal or plastic, using gelatin or similar material for effecting adhesion. Such "sticks" will turn color when moistened with a glucose-containing fluid.

Alternatively, also such a composition may be formed into a tablet and used by applying the fluid to be tested to the tablet, e.g. placing a drop or two of suspect blood on the face of the tablet.

The following examples will serve to document a number of specific embodiments of my invention, and illustrate its flexibility. I have chosen these embodiments hereinafter described as illustrative of my invention and it will be apparent that various modifications may be made without departing from the spirit and scope of my invention.

EXAMPLE I

*Formulation*

| | | |
|---|---|---|
| Peroxidase | mg | 5 |
| Glucose oxidase | mg | 200 |
| o-Tolidine dihydrochloride | mg | 100 |
| Gelatin | mg | 1000 |
| Solid buffer—anhydrous citric acid 32%, sodium citrate dihydrate 68% | grams | 2 |
| Water | ml | 20 |

*Procedure*

In preparing this mixture, the gelatin was dissolved in 5 ml. of boiling water and cooled to room temperature. The 2 gm. of solid buffer was suspended in 5 ml. of water and mixed with gelatin to give a clear solution. The orthotolidine dihydrochloride was dissolved in 5 ml. of water and added to the above mixture, and immediately then there was added 5.0 ml. of water containing the peroxidase and glucose oxidase. This was mixed and filter paper strips were dipped in it. Each strip measured 2 inches by ¼ inch and the strips were air dried or vacuum dried after the dipping. One drop of the blood to be tested is placed on the impregnated area of the strip. One minute later the blood is rinsed off and the color of the strip is observed. The intensity of the blue color is proportional to the amount of glucose in the blood. The above strips gave a blue color when contacted with glucose containing blood illustrating the operability of the concept.

Variations in the foregoing ingredients are of course possible within the skill of the art. For example the orthotolidine dihydrochloride content may vary from 20 to 200 parts; the peroxidase content is also variably present in from 1 up to 100 parts. (This is an expensive ingredient and ordinarily it is unnecessary to use more than about 5 parts of this material in this particular formulation.) The glucose oxidase may vary from 25 to 500 parts. The gelatin content may be up to 1000 parts, the upper limit being dictated by the absorption properties imparted to the composition; too much gelatin naturally retards absorption of blood into the test composition and slows up and interferes with the test; ordinarily it is preferred that from 50 to 500 parts of gelatin be present. Sufficient buffer should be used to "dominate" the pH of blood, so that the pH of the composition where the reactions occur ranges from about pH 4 to about pH 6, preferably, about pH 5.

It will be understood that a number of buffer systems are available, and well known in the art, which will "dominate" the blood and effect a pH at the site of the reaction between about pH 4 and pH 6, preferably, about pH 5.

The following examples illustrate further modification of the inventive concept.

EXAMPLE II

Formulation

| | | |
|---|---|---|
| Glucose oxidase | mg | 200 |
| o-Tolidine dihydrochloride | mg | 100 |
| Gelatin | mg | 200 |
| Solid buffer | grams | 2 |
| Water | ml | 20 |

Procedure

With the exception of the addition of the peroxidase, the procedure used in this modification was the same as that used in Example I.

The test strips gave a positive test when contacted with blood containing glucose; however the reaction was not as satisfactory as with the strips of Example I indicating the utility of the peroxidase in the test composition.

EXAMPLE III

Formulation

| | | |
|---|---|---|
| Peroxidase | mg | 5 |
| Glucose oxidase | mg | 200 |
| o-Tolidine dihydrochloride | mg | 100 |
| Gelatin | mg | 200 |
| Solid buffer | grams | 2 |
| Water | ml | 20 |

Procedure

The procedure of this example was identical with that of Example I. The test setups turned blue when contacted with glucose containing blood as described above.

EXAMPLE IV

Formulation

| | | |
|---|---|---|
| Peroxidase | mg | 5 |
| Glucose oxidase | mg | 200 |
| 2,7-diaminofluorene HCl | mg | 100 |
| Gelatin | mg | 200 |
| Solid buffer | grams | 2 |
| Water | ml | 20 |

Procedure

In this example the composition was prepared as in Example I, the diaminofluorene indicator being substituted for the o-tolidine in Example I. These strips gave a positive test when contacted with blood containing glucose.

A striking characteristic of bibulous strips impregnated with those of the foregoing compositions that contained gelatin as a component was the absence of what I call banding. In those examples where the bibulous paper strip was impregnated with a composition that did not contain gelatin as a component, the blue color that occurred when the strip was contacted with glucose-containing blood was not as sharp, deep, or as clearly defined as with the strips made with the gelatin-containing compositions, and the color in the former case was in the form of a "band" which was rather poorly defined and had migratory fringe areas of more or less inconclusive color quality, shade and depth. When, on the other hand, gelatin was present in the formulation, the resulting bibulous strip on being contacted with glucose-containing blood developed a surprising deep, sharply defined and unmistakable color wherever the glucose containing blood contacted the treated portion of the strip. This, of course, is eminently desirable in that it makes a positive reading easier to make and elinates what might otherwise be doubtful determinations.

While gelatin is the preferred agent for preventing the aforesaid banding, phenomenon, other materials having utility in this regard, are for example, glutamic acid, glycine, algin and other protein degradation products like polypeptides, proteoses and the like.

The preferred indicator component of my composition is o-tolidine, conveniently as the dihydrochloride; other indicators which can be used are those represented by meta-toluidine, mixtures of benzidine and guaiacol, and 2,7-diaminofluorene.

In the foregoing examples the particular glucose oxidase used has an activity of about 2600 units per gram, a unit being by definition that quantity of enzyme which will cause a rate of oxygen uptake of 10 cubic mm. of oxygen at 30° C. by a solution of glucose contained in a Warburg flask. The peroxidase used was obtained from horseradish and its activity was of about the same order as that of the hemoglobin of blood.

There is a wide variability possible in the ratio of glucose oxidase and peroxidase which can be used in preparing the compositions used in the practice of my invention. For example the glucose oxidase content can be increased as much as one hundred times and decreased to even $\frac{1}{10}$ of the amount described and still provide a functional testing device. And it is necessary only that there be sufficient oxidase to catalyze the oxidation of the glucose and enough peroxidase so that it can exercise its own enzyme activity.

And, of course, my invention in any of its various forms e.g., as paper strip or similar bibulous material containing the enzymes, buffers, indicators and the gelatin, or as the tablet or powder can be used to determine the glucose content if not only body fluids (including blood serum, whole blood, urine and the like) but may also be used for determining the glucose content of any glucose-containing fluid.

This application is a continuation-in-part of my co-pending applications, Serial No. 422,977, filed April 13, 1954, Serial No. 514,395, filed June 9, 1955, and now abandoned, and Serial No. 550,859, filed December 5, 1955, and issued as U.S. Patent No. 2,848,308 on August 19, 1858.

What is claimed is:

A method for detecting the presence of glucose in blood which comprises placing a drop of blood on a bibulous material which has been impregnated with a composition from 20 to 200 parts of o-tolidine, from 1 to 100 parts of peroxidase, from 25 to 500 parts of glucose oxidase, sufficient buffer so that when said composition is contacted with blood it dominates the pH of the blood and effects a pH at the reaction site of from about pH 4 to about pH 6 and from 50 to 500 parts of gelatin, allowing the blood to remain in contact with said impregnated bibulous material for about one minute, washing said blood from said impregnated bibulous material, and observing the color change.

References Cited in the file of this patent

UNITED STATES PATENTS

| | | |
|---|---|---|
| 2,848,308 | Free | Aug. 19, 1958 |

FOREIGN PATENTS

| | | |
|---|---|---|
| 203,451 | Australia | Sept. 27, 1956 |

OTHER REFERENCES

"Modern Drugs," May 1956, pages 713 and 728.